United States Patent

Amlinger

[11] Patent Number: 5,935,297
[45] Date of Patent: Aug. 10, 1999

[54] METHOD FOR OPERATING AN ALTERNATING PRESSURE APPARATUS FOR PRODUCING OXYGEN FROM THE AIR

[75] Inventor: Heinrich Amlinger, Niddatal, Germany

[73] Assignee: SGI-Prozesstechnik GmbH, Altenstadt, Germany

[21] Appl. No.: 08/989,022

[22] Filed: Dec. 11, 1997

[30] Foreign Application Priority Data

Dec. 11, 1996 [DE] Germany .......................... 196 51 457
Jun. 18, 1997 [DE] Germany .......................... 197 25 678

[51] Int. Cl.⁶ ............................................. B01D 53/053
[52] U.S. Cl. .................................. 95/21; 95/96; 95/101; 95/130
[58] Field of Search .................. 95/96–106, 130, 95/19, 21, 22; 96/108, 109, 115, 130, 144

[56] References Cited

U.S. PATENT DOCUMENTS

| | | | |
|---|---|---|---|
| 2,800,197 | 7/1957 | Wynkoop | 95/105 |
| 3,085,379 | 4/1963 | Kiyonaga et al. | 95/96 |
| 3,225,518 | 12/1965 | Skarstrom et al. | 95/105 X |
| 3,720,042 | 3/1973 | Simonet | 95/103 |
| 3,923,477 | 12/1975 | Armond et al. | 95/103 |
| 4,070,164 | 1/1978 | Miwa et al. | 95/101 |
| 4,222,750 | 9/1980 | Gauthier et al. | 95/102 |
| 4,264,340 | 4/1981 | Sircar et al. | 95/99 |
| 4,302,224 | 11/1981 | McCombs et al. | 96/109 |
| 4,425,142 | 1/1984 | Mann | 95/106 |
| 4,449,990 | 5/1984 | Tedford, Jr. | 95/102 X |
| 4,472,177 | 9/1984 | Sircar | 95/98 X |
| 4,614,525 | 9/1986 | Reiss . | |
| 4,840,647 | 6/1989 | Hay | 95/100 |
| 4,892,565 | 1/1990 | Schmidt et al. | 95/101 |
| 4,969,935 | 11/1990 | Hay | 95/98 |
| 5,084,075 | 1/1992 | Sircar | 95/103 X |
| 5,122,164 | 6/1992 | Hirooka et l. | 95/98 X |
| 5,163,978 | 11/1992 | Leavitt et al. | 95/96 X |
| 5,207,806 | 5/1993 | Lagree et al. | 95/96 X |
| 5,393,326 | 2/1995 | Engler et al. | 95/103 |
| 5,407,464 | 4/1995 | Schaub et al. | 95/101 X |
| 5,429,666 | 7/1995 | Agrawal et al. | 95/101 |
| 5,453,112 | 9/1995 | Sinicropi et al. | 95/103 X |
| 5,518,526 | 5/1996 | Baksh et al. | 95/100 |
| 5,529,611 | 6/1996 | Monereau et al. . | |
| 5,529,614 | 6/1996 | Engler et al. | 96/130 |
| 5,656,067 | 8/1997 | Watson et al. | 95/101 |
| 5,656,068 | 8/1997 | Smolarek et al. | 95/101 |

FOREIGN PATENT DOCUMENTS

| | | |
|---|---|---|
| 0 082 948 | 7/1983 | European Pat. Off. . |
| 0 135 921 A2 | 4/1985 | European Pat. Off. . |
| 0 447 029 A1 | 9/1991 | European Pat. Off. . |
| 1 265 144 | 4/1968 | Germany . |
| 31 46 189 A1 | 5/1983 | Germany . |
| 44 00 197 A1 | 7/1995 | Germany . |
| 6-254333 | 9/1994 | Japan .......................... 95/96 |
| WO 93/10882 | 6/1993 | WIPO . |
| WO 97/26981 | 7/1997 | WIPO . |

OTHER PUBLICATIONS

Patent Abstracts of Japan, C-822, vol. 15/No. 141, JP 3–21315 (A), Jan. 30, 1991, Jun Izumi.
Patent Abstracts of Japan, C-564, vol. 13/No. 42, JP 63–240914 (A), Oct. 6, 1988, Kazuyoshi Takahashi.
Uew Harms et al., "Druckwechseladsorption an zeolithischen Molekularsieben–einige Betrachtungen zur $O_2$–Anreicherung," *Chemische Technik*, 41, Jg., Heft 5, May 1989, pp. 183–186.
Katalog "Vakuumtechnik" der Firma, Sihi–Halberg, Itzehoe, Teil Vakuumtechnik WPH, 133.3201.53.01, W3, Jul. 1984.

*Primary Examiner*—Robert Spitzer
*Attorney, Agent, or Firm*—Evenson, McKeown Edwards & Lenahan P.L.L.C.

[57] ABSTRACT

An alternating pressure apparatus for obtaining oxygen from the air has two adsorbers to which an air blower for adsorption air and a vacuum pump stand for desorption are connected. The vacuum pump stand has two vacuum pumps in tandem. In a partial load operation characterized by low $O_2$ removal; and during the lower pressure equalization of the adsorbers, the vacuum pump stand is connected to the air blower in that in each case the vacuum valve, connecting one adsorber to the vacuum pump stand, and the air valve, connecting the same adsorber to the air blower, are opened at the same time.

9 Claims, 1 Drawing Sheet

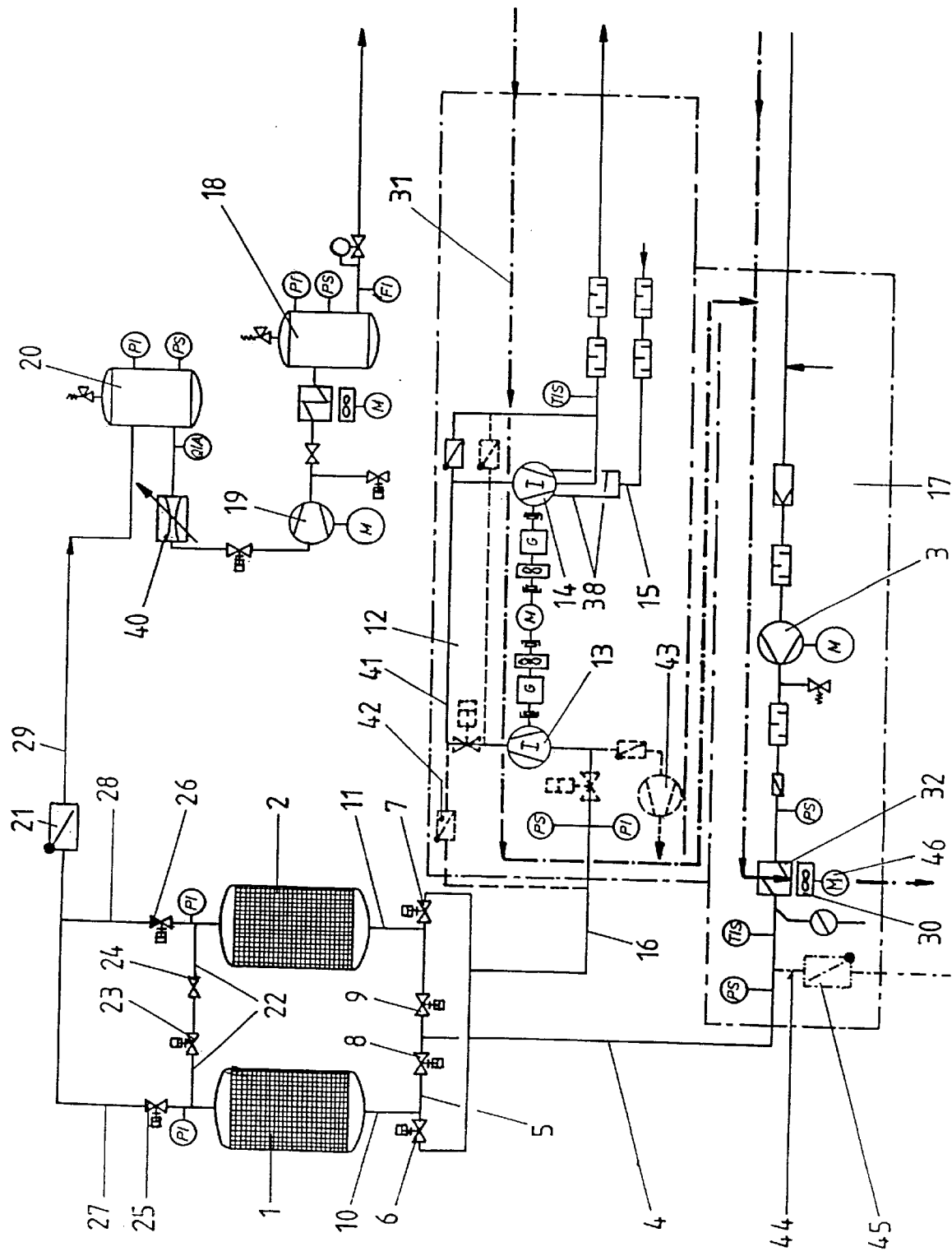

METHOD FOR OPERATING AN ALTERNATING PRESSURE APPARATUS FOR PRODUCING OXYGEN FROM THE AIR

BACKGROUND AND SUMMARY OF THE INVENTION

This application claims the priority of German application No. 196 51 457.6, filed in Germany on Dec. 11, 1996 and German application No. 197 25 678.3, filed in Germany on Jun. 18, 1997, the disclosures of which are expressly incorporated by reference herein.

This invention relates to an apparatus for obtaining oxygen from the air. More particularly, this invention relates to an alternating pressure apparatus for obtaining oxygen from the air, which has at least one adsorber containing synthetic zeolite to which an air blower for the adsorption air and one vacuum pump stand for the desorption of the adsorber are connected for alternate operation, the vacuum pump stand having two vacuum pumps in tandem. The invention furthermore relates to a method for the operation of such an alternating pressure apparatus.

An alternating pressure apparatus of the type described above, which serves, however, for the production of nitrogen from the air, is described for example in DE-A-31 46 189. In the vacuum pump stand of the known alternating pressure apparatus, between the two vacuum pumps there is disposed an intermediate cooler configured as a heat exchanger, which operates dry, in contrast to the cooling by water injection that is generally used, and which cools the air compressed by the first vacuum pump to the extent that no overheating occurs in the second vacuum pump. The second vacuum pump is provided with preliminary inlet cooling. The alternating pressure apparatus according to that disclosure operates with adsorption pressures between 1 bar and 2.5 bar and desorption pressures of 85 mbar.

In alternating pressure apparatus for obtaining oxygen, operation at partial load often occurs, because for a period of time only a reduced amount of oxygen is needed. To save energy in this case it is common during the dead periods to run the vacuum pump stand on bypass. For this purpose a comparatively complicated bypass plumbing, bypass valves and control means for the purpose are necessary, which involves considerable expense.

The present invention solves the problem of designing an alternating pressure apparatus of the kind referred to above such that it will be able to operate in an energy efficient manner when operating at partial load with a minimum cost of construction. Furthermore, a method for operating such an alternating pressure apparatus is provided.

The problem first mentioned is solved according to the invention in that in each adsorber only one line common to pressure and vacuum runs from a distribution line, that on both sides of the point at which the lines are connected to the distribution line an air valve and a vacuum valve are inserted into the distribution line, that the vacuum pump stand has a connection to both outer ends of the distribution line, and the center of the distribution line between the air valves has a connection through a line to the air blower.

Thus the possibility exists, with very little use of piping and valves, for connecting the air blower to the input of the vacuum pump stand. This reduces the pressure difference in the vacuum pump stand to about <200 mbar, so that without the cost of a complicated bypass for the vacuum pump stand it is possible to run at partial load with correspondingly reduced energy demand.

In alternating pressure apparatus for the production of oxygen, however, the cooling of the air by water injection has become widespread, because it was assumed that the vacuum pump stand with the operation of the two vacuum pumps can be virtually isothermic and therefore especially energy efficient.

The injection of water into the oxygen-depleted air aspirated by the vacuum pump stand assumes that extremely clean processed water free of minerals is used so as to avoid malfunction of the vacuum pumps. Often, however, no water or no suitable water is available for injection, so that apparatus using water injection are out of the question and somewhat less energy-efficient apparatus are given preference, like those described in the above-mentioned DE-A-31 46 189. But since such apparatus require water for cooling the air, their employment involves difficulty in many places. Dispensing with cooling water or injection water has not been possible heretofore, however, because the vacuum pumps, configured as rotary piston pumps, tolerate a maximum temperature of about 125° C. to 130° C., and in the known apparatus the aspirated air, unless cooled, would be heated by the compression in the vacuum pump stand to about 200° C. after the second stage.

The alternating pressure apparatus of the instant invention is able to operate in an energy efficient manner without water injection or water cooling and at temperatures safe for rotary piston pumps if according to an embodiment of the invention, the second vacuum pump in the direction of flow is a rotary piston pump with preliminary inlet cooling, having cooling air inlet ports for the defined inflow of outside air of atmospheric pressure, that the inlet connection of the second vacuum pump, without the use of gas cooling by water injection or by heat exchanger has a connection to the outlet of the first vacuum pump, and that the vacuum pump stand is provided with control systems for producing a desorption pressure between 300 mbar and 500 mbar.

Since according to the invention higher desorption pressures are used than in the state of the art, relatively low compression work occurs in the second vacuum pump operating against the atmosphere. Due to the admixture of air from the atmosphere, the heat thus produced causes little or no temperature rise, so that the vacuum pump stand can operate entirely without water injection or water cooling. Surprisingly, measurements on a constructed alternating pressure apparatus according to the invention showed that, at the same oxygen yielding power as in known alternating pressure apparatus, the energy required is even lower.

An especially low energy requirement is achieved if, according to an advantageous embodiment of the invention, the cooling air inlet ports of the second vacuum pump are of such dimensions and positions that the ratio of the total mass flow of the aspirated mass flow of the first vacuum pump and of the cooling air mass flow to the cooling air mass flow at the start of the desorption cycle drops rapidly from a high level to 33 and during the desorption cycle slowly drops to 1.5 by the end.

It is important to the cooling principle according to the invention that, in the rotary piston pump operating as a vacuum pump, the rotary pistons block the connection to the inlet connection before the working pump chamber receives a connection to the atmosphere and therefore the air can flow in and perform compression work. This can be achieved economically because, according to another embodiment of the invention, the cooling air entry ports in the second quadrant begin not before 36° and end before 90°.

The fundamental frequency of the pulsations can be doubled, so that simple pulsation dampers can be used if the cooling air inlet ports are connected by a common line to the atmosphere.

Since the air blower for the adsorption air and the vacuum pump stand produce very bothersome noise in operation, these parts of apparatus are usually disposed in a noise-suppressing box container. Therefore a great deal of expense is involved in cooling with a positively driven air stream. This expense can be kept comparatively low if, according to another embodiment of the invention for cooling the apparatus, a blower of an air cooler necessary for the adsorption air is provided, and if a cooling air stream is guided along the vacuum pump stand and the adsorption air blower to the blower.

An excessively low temperature of the air entering the adsorber can be prevented simply by providing the blower with a controlled-speed fan motor. In this manner the amount of cooling air can be reduced at low external temperatures by reducing the speed of the blower.

The alternating pressure apparatus is very economically constructed if a radial blower with a controlled throttle in its intake line is provided as the first vacuum pump.

It is also desirable if only one line common to the positive pressure and the negative pressure runs from a distribution line or manifold into each adsorber, if an air valve and a vacuum valve are inserted into the distribution line on each side of the point where the lines are connected to the distribution line, and if the air blower or the vacuum pump stand is connected to the two outer ends of the distribution line and a line from the vacuum pump stand leads into the middle of the distribution line between the air valves. In this manner it is made possible with very little expenditure on piping and valves to connect the air blower to the inlet of the vacuum pump stand when operating at partial load. Thus the pressure difference of the vacuum pump stand is reduced to about 200 mbar, so that without the expense of a complex bypass for the vacuum pump stand it is possible to operate at partial load with a correspondingly lower energy demand.

Back flow of oxygen from the buffer tank through the adsorbers and then through the vacuum pump stand to the atmosphere when running at idle, when the air blower is connected to the inlet of the vacuum pump stand, can very easily be prevented by providing a shut-off in the product delivery line.

The shut-off is of very simple construction and does not need to be operated in harmony with the adsorber outlet valves if it is a check valve opening toward the storage tank.

When running at partial load it is possible to operate entirely without the first vacuum pump in the form of a radial blower, and thus save much energy, if, according to another embodiment of the invention, the first vacuum pump in the form of a radial blower has a bypass line connecting its suction line directly to the second vacuum pump in the form of a rotary piston pump, and containing a check valve port toward the second vacuum pump.

For further improvement of the energy balance it is helpful if, to evacuate the first vacuum pump, configured as a radial blower, an auxiliary pump is provided. Thus the radial blower can run partially loaded without having to perform work.

The vacuum pump stand is able, independently of the air blower, to aspirate air from the atmosphere if an air inlet line having a check valve closing toward the atmosphere is inserted into the line connecting the air blower to the adsorbers. Such a configuration, however, is necessary only in exceptional cases.

The second problem referred to, namely the creation of a method for operating an alternating pressure apparatus with the above-described features, is solved by the invention in that at partial load operation characterized by low oxygen uptake, the adsorption pressure is increased above the adsorption pressure at full-load operation, and when a set top adsorption pressure is reached, the air blower for the adsorption air is switched ahead of the two-stage vacuum pump stand. With this procedure it becomes possible with little investment to operate at partial load very economically.

Partial load operation can be terminated with especially little effort if the pressure at the storage tank or buffer tank is monitored, and when it falls below a set level, the air valves and vacuum valves are switched back to cyclical adsorption and desorption. The pressure drop that is measured indicates that oxygen uptake is again increasing.

The use of the alternating pressure apparatus of the present invention is desirable in regions without sufficient high purity water when a rotary piston pump with precooled inlet is used as the second pump in the direction of flow, and if a controlled flow of outside air at atmospheric pressure is added, when the gas leaving the first vacuum pump is fed to the inlet of the second vacuum pump without the interposition of gas cooling by water injection or the use of a heat exchanger, and when the vacuum pump stand is operated at a desorption pressure between 300 mbar and 500 mbar.

With a method of operation of this kind it is possible to produce oxygen without cooling water or water injection and with an energy consumption decidedly lower than in the known apparatus.

It is especially good from the energy viewpoint if, according to a preferred embodiment of the invention, the cooling air inlet ports of the second vacuum pump are of such dimensions and positions that the ratio of the total mass flow of the aspirated mass flow of the first vacuum pump plus the cooling air mass flow to the cooling air mass flow at the start of the desorption cycle falls rapidly from a high level at the start of the desorption cycle to 33, and within the desorption cycle slowly sinks to 1.5 by the end.

It has been possible to learn by experiment that energy consumption is especially favorable if, according to another embodiment of the method, an adsorption pressure between 0.7 bar and 1.8 bar, preferably between 0.9 bar at the beginning and 1.5 bar at the end of the adsorption is selected along with a desorption pressure between 350 mbar and 400 mbar, and if the starting pressure for the adsorption and desorption after the purging phase and the pressure build-up phase amounts to a minimum of 700 mbar and a maximum of 950 mbar.

After a changeover to building up pressure, in order to be able to achieve a build-up to adsorption pressure in an adsorber, according to another embodiment of the invention the pressure is throttled by means of a throttle in the product delivery line behind the buffer tank.

It is also beneficial to the operation of the alternating pressure apparatus if the throttle is followed by a buffer tank and the capacity of the latter is such that the pressure in the buffer tank varies between 1.2 bar and 1.5 bar within an adsorption cycle.

The adsorption air blower and the vacuum pump stand are cooled by a positively guided air stream, without the danger of an excessively low input temperature in the adsorber at low outside temperatures, if a blower of an air cooler required for the adsorption air is used for cooling the parts of the apparatus, if a cooling air stream is carried along the vacuum pump stand and the adsorption air pump stand to the blower, and if the blower is controlled by a frequency-controlled fan motor such that the temperature of the air entering the adsorber does not fall below a minimum level.

Experience has shown that the oxygen concentration is considerably reduced if the adsorption temperatures fall below 20° C. By the procedure of the invention, decreasing outside temperatures can be compensated by reducing the volume of the cooling air stream.

If the outside temperature is so low that reducing the speed of the cooling air blower is insufficient to maintain adsorption temperatures above 20° C., it is possible according to an embodiment of the invention to use the hot air put out by the vacuum pump stand to raise the temperature of the air from the air blower. Thus, a throttle valve is installed ahead of the air blower so that some cold air is aspirated from the container housing the vacuum pump stand, and another air stream preheated by the vacuum exhaust through a heat exchanger is aspirated directly at the exhaust air exit. By this the temperature level after the air blower is raised accordingly, so that the 20° C. adsorption temperature can be maintained by controlling the speed of the motor driving the cooling air blower. This preheating is possible because the second vacuum pump according to the invention operates without water injection and thus operates at higher temperatures than in the state of the art.

BRIEF DESCRIPTION OF THE DRAWINGS

Other objects, advantages and novel features of the present invention will become apparent from the following detailed description of the invention when considered in conjunction with the accompanying drawings wherein:

FIG. 1 is a schematic diagram showing the circuit of an alternating pressure apparatus according to the invention.

DETAILED DESCRIPTION OF THE PREFERRED EMBODIMENTS

FIG. 1 shows a PVSA (pressure vacuum swing adsorption apparatus) according to the invention, which operates with synthetic zeolite in two adsorbers 1, 2, connected in parallel. Air is fed alternately to these adsorbers by means of an air blower 3 in the form of a rotary piston pump in a pump stand 17. The blower 3 furthermore serves to produce and maintain the necessary adsorption pressure. For this purpose a line 4 connects the air blower 3 to a distribution line or manifold 5 into which two vacuum valves 6, 7 are inserted on the outside and two air valves 8 and 9 on the inside. The line 4 opens into the distribution line 5 between the air valves 8 and 9, and lines 10 and 11 run from points between vacuum valves 6 and 7 and air valves 8 and 9, respectively, to the adsorbers 1 and 2.

For the alternating evacuation of the adsorbers 1 and 2 and thus for aspirating the nitrogen-enriched fraction from the adsorbers 1 and 2, a vacuum pump stand 12 is used, which has two vacuum pumps 13 and 14 in tandem. The vacuum pump 14, which forms the second pump stage and is disposed on the atmosphere side, is a rotary piston pump with a pre-cooled inlet, which will be described later in conjunction with FIG. 2. Into this second vacuum pump 14 air flows from the atmosphere through a line 15 to cool it.

The vacuum pump stand 12 is connected by a suction line 16 to the two outer ends of the distribution line 5. The vacuum valves 6 and 7 and air valves 8 and 9 make it possible to feed compressed air from the air blower 3 to the suction side of the first vacuum pump 13 of the pump stand 12 during part-load operation.

The oxygen is delivered from a storage tank 18 which is preceded by a blower 19 or compressor, so that the oxygen comes out under pressure. The blower 19 or compressor is preceded by a buffer tank 20 into which the oxygen is fed with a purity of up to 95% through a shut-off valve 21. The shut-off valve is a check valve that opens from the adsorbers 1 and 2 to the storage tank 18.

The outlets of the two adsorbers 1 and 2 are connected together by a connecting line 22 into which there is inserted a shut-off valve 23 and a throttle 24. By means of this connecting line 22, the shut-off valve 23 and the throttle 24, the two adsorbers 1 and 2 are connected to one another for purging by the adsorber 2 or 1 that is still in adsorption, purged with the air blower 3 and vacuum pump stand 12 running, and thus a first build-up of pressure in the regenerated adsorber to about 500 mbar is achieved. After this purge the product delivery valves 25 and 26 in lines 27, 28, which run to a product removal line 29 with the check valve 21, are opened. By the simultaneous opening of the air valve 8 or 9 associated with the particular adsorber 1 or 2, the latter is then connected to the air blower 3 as well as to the pump stand 12, so that another pressure build-up can take place or a pressure equalization in both adsorbers 1 and 2, top and bottom.

The lower pressure equalization operates precisely the same as running at partial load, but this function is very brief and always is repeated cyclically. For example, if adsorber 1 is regenerating and adsorber 2 is adsorbing, the lower valves are operated as follows: valve 6 open, valve 8 closed, valve 9 open and valve 7 closed. During the lower pressure equalization, valve 8 is additionally opened within a certain amount of time within the pressure equalization period. Then valve 7 is opened and valve 8 closed, and after the pressure equalization period ends, valve 9 is closed. This assures that, during the lower pressure equalization a connection of the vacuum pump stand 12 to the air blower 3 is maintained exactly as during partial load operation. The advantage is that, within the pressure equalization time the valves are brought to the correct position for the next adsorption and desorption, so that the periods during which no production takes place are especially short.

With the kind of pressure equalization described, the lower pressure equalization is performed simultaneously with the upper pressure equalization. Thus nitrogen is aspirated away downwardly from the particular adsorber. Due to the pressure equalization, it is not the nitrogen but mostly air that flows into the regenerated adsorber from the first adsorber.

After the pressure has built up from 500 mbar to 900 mbar, the corresponding vacuum valve 7 or 6 of the regenerated adsorber 1 or 2 is closed, and at the same time the corresponding product delivery valve 25 or 26 is closed for the adsorber 1 or 2 that is to be regenerated, so that the adsorption phase takes place in the regenerated adsorber 1 or 2 and the desorption phase in the adsorber 1 or 2 that was previously in adsorption.

In the pump stand 17 with the air blower 3 only one air cooler 32 operating with air as coolant has been indicated, with which a blower 30 is associated by which a stream of cooling air 31 is first aspirated by the air cooler 32 at one end of the vacuum pump stand 12, then back to its other end, and then along the pump stand 17 for the adsorption air. The usual components, such as filters, sound mufflers, a safety valve and valves have not been indicated. The air cooler 32 serves to recool the air compressed to a maximum of 1.5 bar by the air blower 3 in the form of a rotary piston blower. This pressure is set by the amount of product withdrawn and the throttle 40 behind the buffer tank 20, so that, in the adsorber 1 or 2 that is adsorbing, the desired maximum pressure is reached after each adsorption phase. The adsorption temperature is controlled by controlling the speed of blower 30 by means of a frequency-controlled fan motor 46.

In the case of vacuum stand 12, the position of common components has not been indicated, either. It is important to the invention that the compressed, hot and oxygen-depleted air at 50° C. to a maximum 110° C. coming from the first vacuum pump 13 is fed directly in each cycle to the second vacuum pump and aspirated at this temperature from the second vacuum pump.

In FIG. 1, furthermore, there is shown a bypass line 41 through which the second vacuum pump 14 can be connected directly to the adsorbers 1 and 2 without going through the first vacuum pump 13. A check valve 42 is inserted into this bypass line 41, which opens toward the second vacuum pump 14. An auxiliary pump 43 can be provided for the evacuation of the first vacuum pump.

In order to connect the inlet side of the vacuum pump stand 12 to the atmosphere even while the air blower is not running, an air inlet line 44 with a check valve closing toward the atmosphere leads into line 45.

As FIG. 1 shows, line 15 branches into hoses 38 in order to connect both of the cooling air ports 33 and 34 to the atmosphere. Thus, pulsations of twice the fundamental frequency occur in line 15, so that simple pulsation dampers suffice.

The alternating pressure apparatus described operates preferably at a total cycle time of 2×33 to 2×45 sec. Thus from 7 to no more than 15 seconds fall to the flushing and pressure equalization phase. This flushing and pressure equalization phase is performed whenever the alternately occurring switchover from adsorption to desorption takes place in the one adsorber 1 or 2 and from desorption to adsorption in the other adsorber 1 or 2.

Lastly, it should be noted that all of the pressures specified are absolute pressures.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for the operation of an alternating pressure apparatus for obtaining oxygen from the air, comprising:

alternately applying pressure to two adsorbers by an air blower for the adsorption of nitrogen and a vacuum for desorption, wherein a vacuum pump stand with two vacuum pumps connected in tandem is used for producing the vacuum, wherein in a partial load operation having low $O_2$ removal, and during a lower pressure equalization of the adsorbers, said method further comprises:

connecting said vacuum pump stand to the air blower by opening a vacuum valve connecting one adsorber to the vacuum pump stand and an air valve connecting said one adsorber to the air blower at the same time.

2. A method according to claim 1, further comprising:

in the partial load operation, raising the adsorption pressure above the adsorption pressure at full load operation, and upon reaching an established upper adsorption pressure, connecting the air blower for the adsorption air ahead of the pump stand.

3. A method according to claim 1, wherein the apparatus includes a storage tank and a buffer tank connected to the adsorber and air valves and vacuum valves for controlling adsorption and desorption, said method further comprising:

monitoring the pressure at the storage tank or buffer tank and, when it falls below a set level, switching the air valves and vacuum valves back to cyclic adsorption and desorption.

4. A method according to claim 3, wherein the apparatus further comprises a throttle in the product delivery line after the buffer tank to thereby enable pressure build-up to adsorption pressure at a desired time after an adsorber is switched to pressure build-up.

5. A method according to claim 4, wherein the capacity of the buffer tank is such that the adsorption pressure in the buffer tank varies between 1.2 bar and 1.5 bar within an adsorption cycle.

6. A method according to claim 5, wherein a blower of an air cooler necessary for the adsorption air is used for cooling parts of the apparatus, said method further comprising directing a cooling air stream along the vacuum pump stand and a pump stand for the adsorption air to the blower, and controlling the blower by means of a frequency-controlled fan motor such that the temperature of the air entering the adsorber does not drop below a bottom value.

7. A method according to claim 6, further comprising, at low outside temperatures, using the hot exhaust air of the vacuum pump stand for raising the temperature of the air from the air blower.

8. A method according to claim 1, wherein the lower pressure equalization takes place at the same time as an upper pressure equalization.

9. A method according to claim 1, further comprising selecting an adsorption pressure between 0.7 bar and 1.8 bar, and a desorption pressure between 350 mbar and 400 mbar, and wherein the starting pressure for the adsorption and desorption after flushing phase and pressure build-up phase amounts to a minimum of 700 mbar and a maximum of 950 mbar.

* * * * *